United States Patent [19]
Berecz

[11] 3,750,257
[45] Aug. 7, 1973

[54] SYSTEMATIZED APPARATUS FOR DRIVING FASTENERS

[75] Inventor: Imre Berecz, Yorba Linda, Calif.

[73] Assignee: Kaynar Mfg. Co., Inc., Fullerton, Calif.

[22] Filed: Dec. 30, 1971

[21] Appl. No.: 214,262

[52] U.S. Cl. .................................. 29/212 R, 29/240
[51] Int. Cl. ....................... B23p 19/00, B23p 19/04
[58] Field of Search ...................... 29/212 R, 212 D, 29/212 T, 240

[56] References Cited
UNITED STATES PATENTS
3,367,015  2/1968  Brosene, Jr. ...................... 29/212 T
3,494,014  2/1970  Lundgren .......................... 29/212 R

Primary Examiner—Thomas N. Eager
Attorney—Maurice J. Beck

[57] ABSTRACT

This construction relates to systematized apparatus for driving fasteners used in assembly of fabricated structures. The system incluces a power-operated portable tool for automatically delivering individual threaded female fasteners for attachment to a cooperating bolt and sequentially rotating the fastener to form a bolted connection. The construction provides a supply of fasteners, a feeding mechanism to deliver individual fasteners to a driving station, and an automatically controlled power tool for drivably rotating the fastener. The construction has particular utility in driving fasteners having external wrenching surfaces of a diametral dimension less than that of the base of the fastener.

14 Claims, 13 Drawing Figures

SYSTEMATIZED APPARATUS FOR DRIVING FASTENERS

BACKGROUND OF THE INVENTION

It is a common design practice to provide for the fabrication of many assembled articles by the use of threaded bolts and female fasteners, also referred to as nuts. In many environments, it is essential that a considerable quantity of such fasteners be readily available to assembly workmen and that the fasteners be rotated or driven by power tools for more effective fabrication. While previously known hopper-type supply devices are satisfactory for the type of nut having an external wrenching surface at a uniform diametral dimension, such devices are unable to deliver individual fasteners, which have an enlarged bearing base and a smaller wrenching configuration axially spaced from the base. Previously available power-driven tools are unable to perform the sequential functions of delivering individual fasteners of such a type and of drivingly rotating the same.

In the assembly of aircraft structures, literally hundreds of thousands of threaded fasteners are used in fabricating such structures. Accordingly, a need has existed for systematized apparatus to deliver individual fasteners and sequentially to rotate the same during tightening with a cooperating bolt. Therefore, it is an object of the present invention to provide such systematized apparatus. A further object is to provide a portable power tool capable of fulfilling the heretofore recognized need in assembling aircraft structures using female threaded fasteners.

It is another object of the invention to provide a portable power tool capable of carrying a supply of female fasteners and delivering individual fasteners for drivable rotation onto a receiving bolt. A still further object of the invention is to provide a tool capable of individual delivery and powered rotation of discrete female fasteners, the sequential operation of which is powered by a separate means for each of the two functions, and the separate means are controlled by correlated control means within the tool.

The invention will be more readily understood by reference to the accompanying drawings in which.

DESCRIPTION OF THE PREFERRED EMBODIMENT

Figures 1, 4, 5:
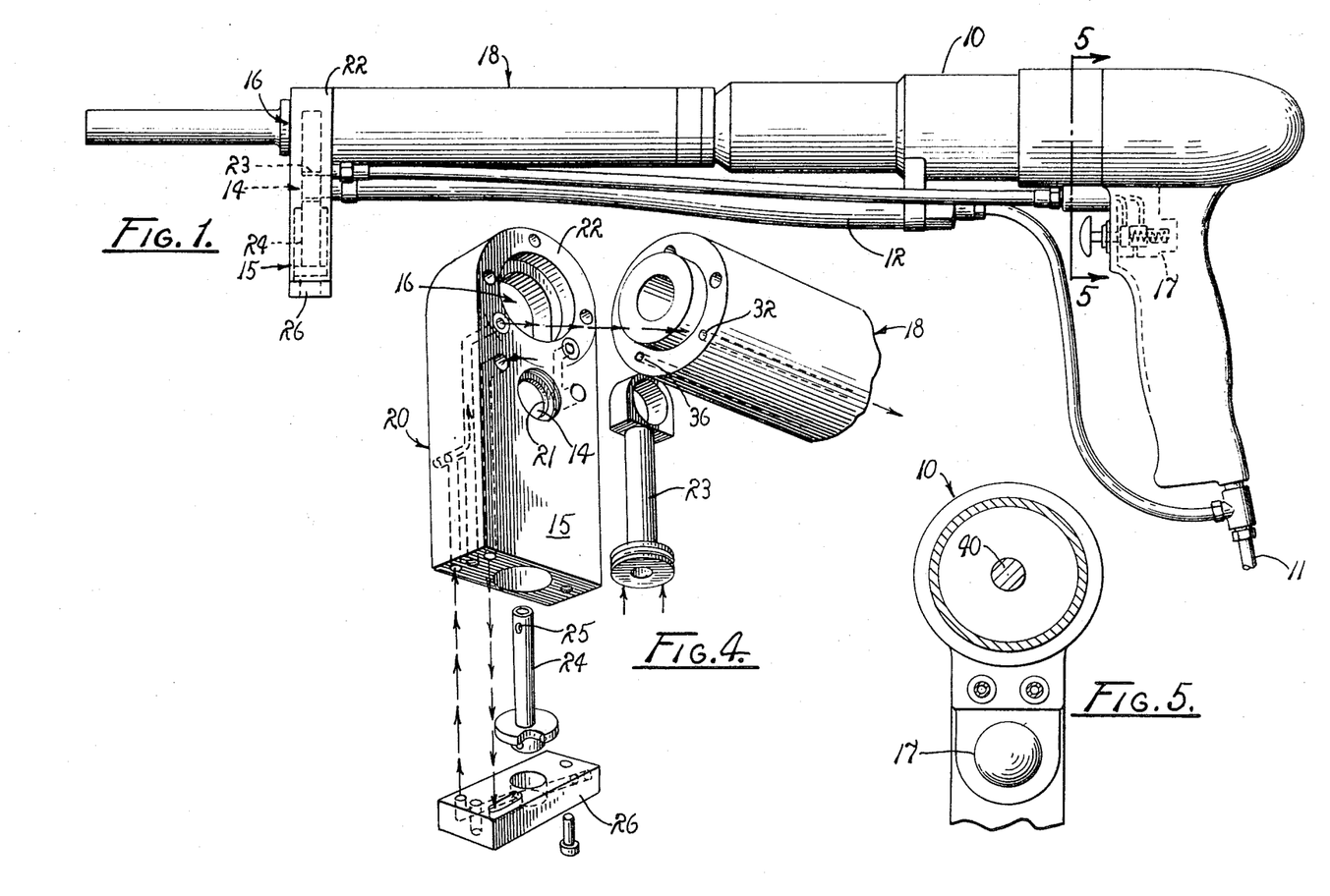
FIG. 1 is a view in side elevation showing one form of fastener, or nut driving tool embodying the present invention.
FIG. 4 is an exploded isometric view of the nut transfer mechanism of the invention, portions of the fluid control circuitry being shown somewhat schematically.
FIG. 5 is a fragmentary view in vertical transverse section taken on line 5—5 of FIG. 1.

As illustrated in FIG. 1, the invention provides a portable tool which includes a rigid frame in the form of external housing 10. Carried within the housing is a conventional fluid operated motor, preferably a commercially available pneumatic motor (not shown). Such motor may be reversible for driving in either direction of rotation; however, the present invention is adequately served by a unidirectional motor rotating in a conventional clockwise direction for tightening of a bolted connection. A line 11 extending from the housing is connected to a suitable source of air under pressure (not shown) for operation of the pneumatic motor as well as powering the transfer and driving mechanism to be described below. The tool is also provided with a supply magazine 12, in the form of an elongated tubular hopper containing a supply of nuts such as those indicated at 13 in FIG. 2. The air under pressure exerts a motivational force against the nuts in the magazine thereby to urge them toward a delivery or discharge station 14 at the exit of the supply hopper. A transfer mechanism 15 is provided for transporting nuts from the delivery station to a driving station indicated at 16. A control valve 17 in the form of a manually depressed trigger admits air to 15 for sequential operation of the transfer mechanism and a reciprocable and rotatable driving mechanism enclosed within section 18.

TRANSFER MECHANISM

As illustrated more clearly in FIG. 4, the nuts 13 are transferred from the delivery or discharge station 14 to the driving station 16, by a shuttle mechanism carried within a housing 20 and provided with an opening 21 coincident with delivery station 14. An upper bearing ring 22 encircles a reduced portion of the driving section 18 and encloses the driving station 16. A shuttle piston 23 is mounted for reciprocation within housing 20 and is guided on a post 24 rigidly secured to the housing. The upper or free end of the piston 23 is in the form of a yoke adapted for releasably holding an individual fastener. Adjacent the upper end of the post, an air inlet port 25 is provided to establish communication between the cylinder in which piston 23 reciprocates and a central channel within the post for proper sequential operation of the shuttle piston and driving mechanism to be described below. An end block 26, secured to housing 20, serves as an anchor for the post 24 and is provided with suitable passageways to provide fluid communication between the several ports of the sequencing mechanism. As schematically shown in FIG. 4, the internal passageways of the end block 26 and the housing 20 are located so as to establish communication with similar passageways provided in the driving section 18 when the component parts are assembled. Obviously, other types of fluid communications could be established, such as external flexible hoses. Flow through the circuits is under control of valve 17 to effect extension and retraction of piston 23.

DRIVE MECHANISM

Figures 2, 3:
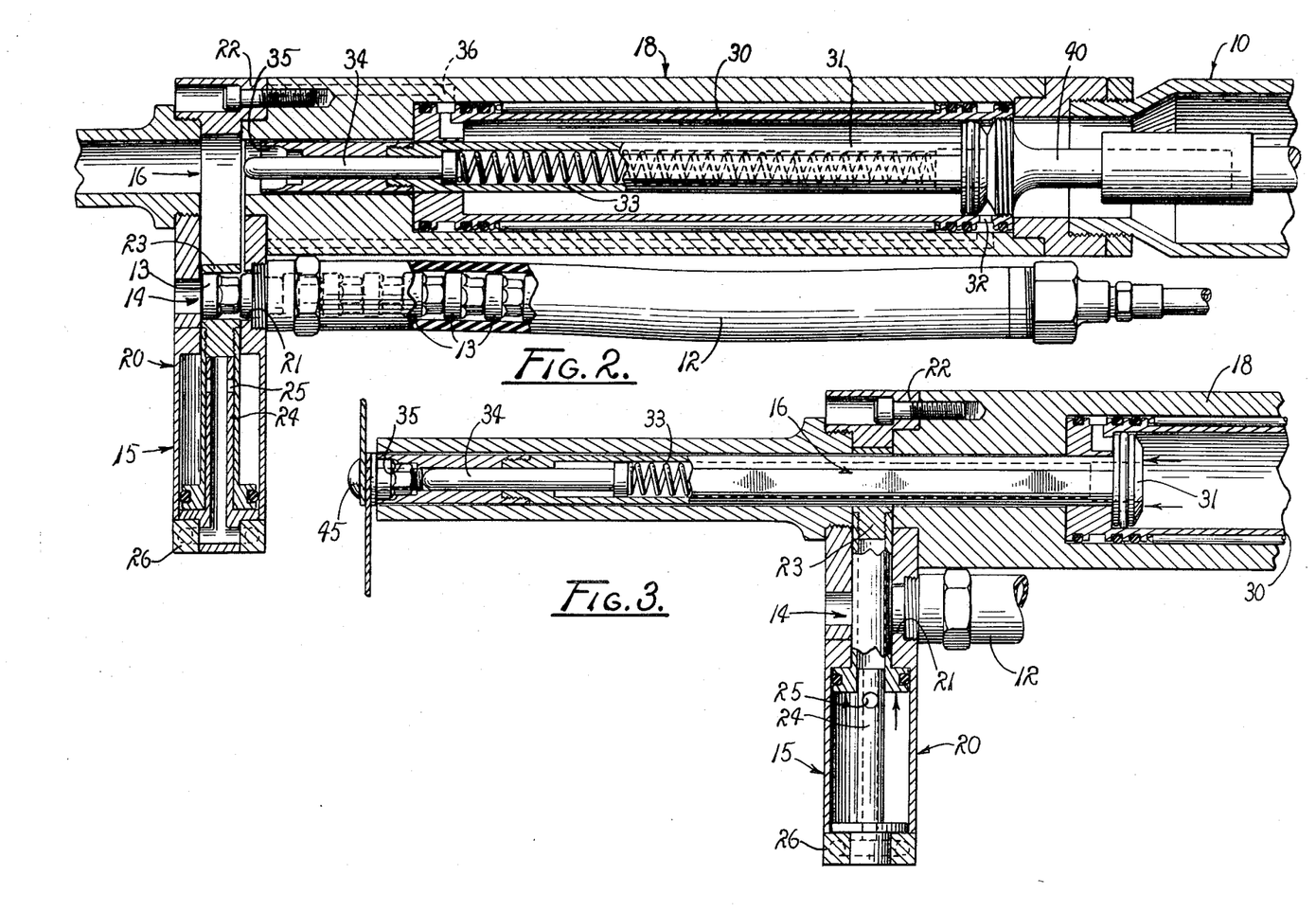
FIG. 2 is a fragmentary view in vertical longitudinal section of the tool of FIG. 1 showing the relationship of the fastener supply, the transfer mechanism and the driving components of the tool, the latter being in a retracted position.
FIG. 3 is an enlarged fragmentary view of the forward portion of the tool showing the details of the nut driving component in an extended position to drive a nut onto to a receiving bolt.

FIG. 2 illustrates the components of the nut drive mechanism which includes a cylinder piston assembly 30 mounted for rotation about the axis of the pneumatic motor and is rotatably driven by that motor. A piston 31 is mounted for reciprocation within the cylinder 30 between a retracted position as shown in FIG. 2 and an extended position as illustrated in FIG. 3. A fluid inlet port 32 is provided in cylinder 30 and serves alternatively as an inlet and exhaust port during reciprocation of the piston 31. The piston contains a spring 33 which urges a pilot pin 34 outwardly and forwardly and is encircled by a nut receiving socket 35 at the forward end of the piston. The socket is provided with internal wrenching surfaces complementary to the wrenching surfaces afforded by nuts 13. Upon admission of air under pressure through port 32, the piston will extend to the position shown in FIG. 3, and subsequent or concurrent operation of the pneumatic motor will cause rotation of the socket 35. A port 36 is provided within a cylinder 30 for admission of air under pressure to retract the piston to the position shown in FIG. 2, and for exhausting air during extension of the piston.

OPERATION

The supply magazine 12 is first loaded with a supply of nuts 13 and the line 11 is connected to a suitable source of air under pressure. With the control valve or trigger 17 in a released position, air under pressure is admitted through port 36 causing retraction of piston 31. Concurrently, the same air pressure is acting upon the upper face of the shuttle piston 23, also urging it to the retracted position as shown in FIG. 2. The air is also urging the nuts 13 in magazine 12 toward the delivery station, and continues to move them in that direction until a nut is positioned in the delivery station.

Upon depressing control valve 17, the air retracting shuttle piston 23 and drive piston 31 is shut off, and air under pressure is sequentially directed to the respective extension face of each of these pistons. Initially, air is routed to the underside extension face of shuttle piston 23, via the passageway in transfer housing 20. Upon extension, or raising of piston 23 to the position shown in FIG. 3, air flows through port 25 in post 24 and downwardly along the axial conduit for transmission through another passageway in housing 20. The details of such fluid circuit is not an essential part of the invention, and hence are described somewhat functionally in relation to the structural and schematic illustrations of FIGS. 2 and 3. It is important to provide some structural means, such as the relation of the piston 23, post 24 and the central passageway therein, including port 25, which insures proper sequential movement of the transfer mechanism prior to operation of the drive mechanism. As the transfer shuttle piston 23 moves to the position shown in FIG. 3, an individual nut is carried from the delivery station as shown in FIG. 2 to the driving station illustrated in FIG. 3. After shuttle piston 23 has so moved, the air under pressure passing through port 25 and thence downwardly through the axial passageway of post 24 is routed to port 32 of cylinder 30. Air entering port 32 is directed to the rear, or extension, face of piston 31, moving the piston forwardly to an extended driving position shown in FIG. 3. Concurrently, air from the valve 17 is directed through a conduit (not shown) to the pneumatic motor supported within housing 18 and connected to cylinder 30 in a driving relationship as by shaft 40. Accordingly, depression of trigger 17 will first cause sequential extension of shuttle piston 23 moving a nut from the delivery station to the driving station and subsequent extension of the piston 31 of drive mechanism which causes the socket 35 to encircle and carry the nut forwardly for securing to the bolt indicated at 45.

The spring biased pilot pin 34 is adapted for axial engagement with the threaded end of the bolt thereby aiding in starting of the nut onto the threaded shank of the bolt. The pilot pin also aids the centering of the nut as the rotating socket engages the nut at the driving station, thereby ensuring positive engagement of the wrenching surfaces of the nut and the internal surfaces of the socket. As can be seen in FIG. 3, the enlarged base of the nut 13 in relation to the smaller diametral dimension of the wrenching surface precludes axial feeding of the nut through the driving socket. Accordingly, some type of transfer mechanism must move the nut of such a configuration in a path of travel at least angularly related to or substantially normal to the axis of rotation of the driving socket.

It will be noted that the pneumatic drive motor may be rotated during extension of the drive piston 31, which will facilitate a pick-up of the wrenching surfaces of the nut within the complementary inner surfaces of the socket 35. The pneumatic motor continues to rotate so long as control valve 17 is depressed. Normally a torque limiting device is interposed in the pneumatic motor and the drive shaft 40. Such a device may be in the form of a conventional torque limiting clutch (not shown), which is well known to those skilled in the art and forms no essential part of the present invention. Such a clutch may be set at a predetermined value so as to limit the torque applied to the nut by the drive socket 35.

Upon reaching that predetermined value of torque force, the clutch disengages indicating to the operator that the nut has been satisfactorily driven. Thereupon, the workman releases control valve 17 which closes air flowing to the extension faces of pistons 23 and 31. Control valve 17 in its then neutral position again routes air to the upper side of piston 23 as well as to port 36 of piston 31, thereby retracting both of these pistons. Since the socket 35 has passed through the upper circular yoke of piston 23, this piston does not retract until piston 31 reaches the retracted position shown in FIG. 2. At the same time, air is still supplied under pressure to nuts 13 within supply magazine 12. Accordingly, upon full retraction of shuttle piston 23 another nut is urged forwardly into the delivery station to be releasably held by the yoke of the shuttle piston. The nut is then ready for transfer to the driving station upon depression of trigger 17 and consequent extension of piston 23.

For reasons of clarity, magazine 12 has been shown as a simple elongated tube-type of hopper, having finite dimensions of length; however, the hopper could be greatly elongated, even to the point of coiling the same for reasons of transportability. Additionally, the excess in the hopper 12 of nuts over the quantity then required for assembly work being performed may be considered a reserve inventory of nuts for subsequent assembly operation.

SECOND FORM OF THE INVENTION

Figure 6:
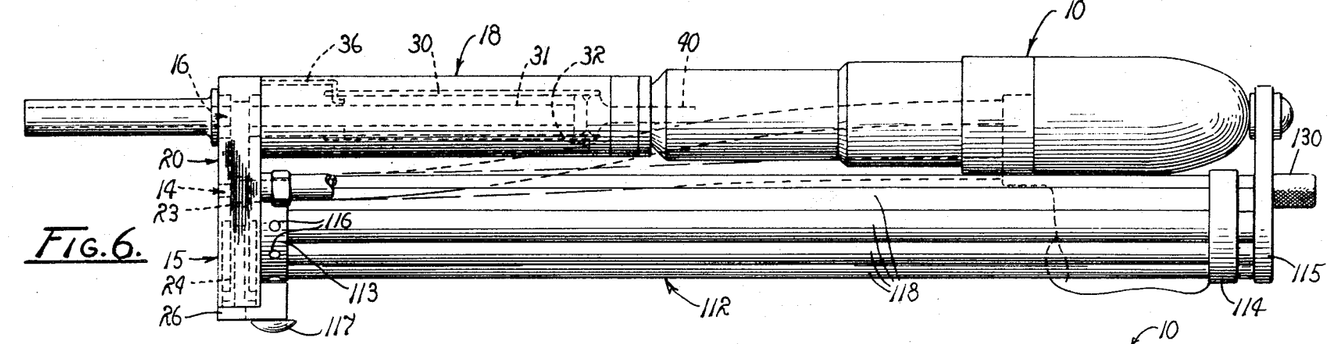
FIG. 6 is a view in side elevation similar to FIG. 1, but showing a second form of a nut driving tool embodying the invention and forming a part of the systematized apparatus.

A modified form of the invention is shown in FIGS. 6 through 13, in which the supply magazine 12 is in the form of a cylindrical element having a plurality of individual chambers circumferentially spaced about the axis of rotation. As shown in FIG. 6, a generally cylindrical magazine 112 is mounted in longitudinally spaced bearing plates 113 and 114, thereby permitting rotation about the longitudinal axis of the cylinder. A spring-pressed detent 117 is shown at the forward end of the cylinder and has projecting point adapted to be received in locating depressions 116. When so received, the detent insures axial alignment of a selected chamber with the delivery station 14.

It is to be understood that the portable driving tool is essentially the same as disclosed and described above in connection with FIGS. 1 through 5, that is the tool is provided with a drive socket to be rotated by a pneumatic motor and sequencing of the transfer mechanism 15 is insured through appropriate pneumatic circuitry. Accordingly, the drive mechanism in section 18 operates only upon movement of a nut from the delivery station 14 to the driving station 16.

Figure 7:
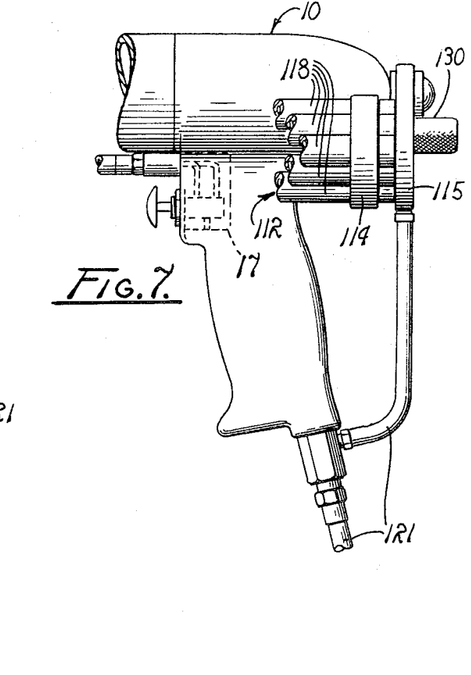
FIG. 7 is a fragmentary view of the tool of FIG. 6, showing the hand grip in side elevation.
Figure 8:
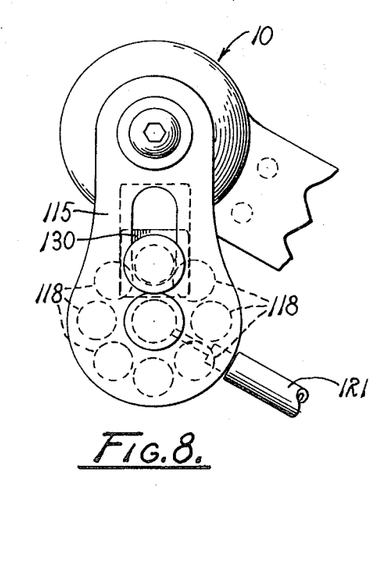
FIG. 8 is an end view of the tool of FIG. 6, as viewed from the right.
Figure 9:
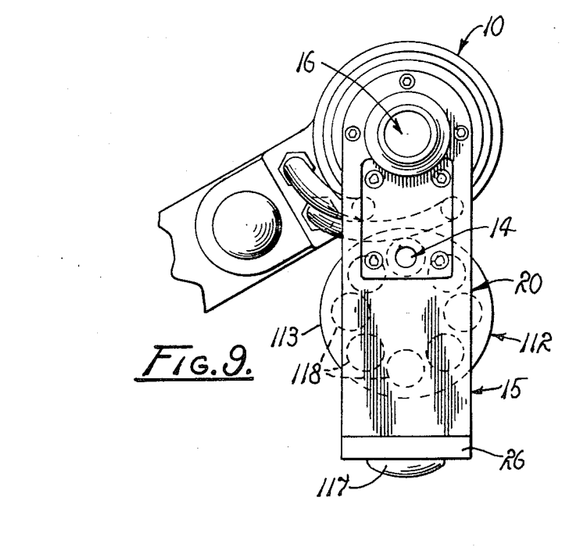
FIG. 9 is an end view of the tool of FIG. 6, as viewed from the left.
Figure 10:
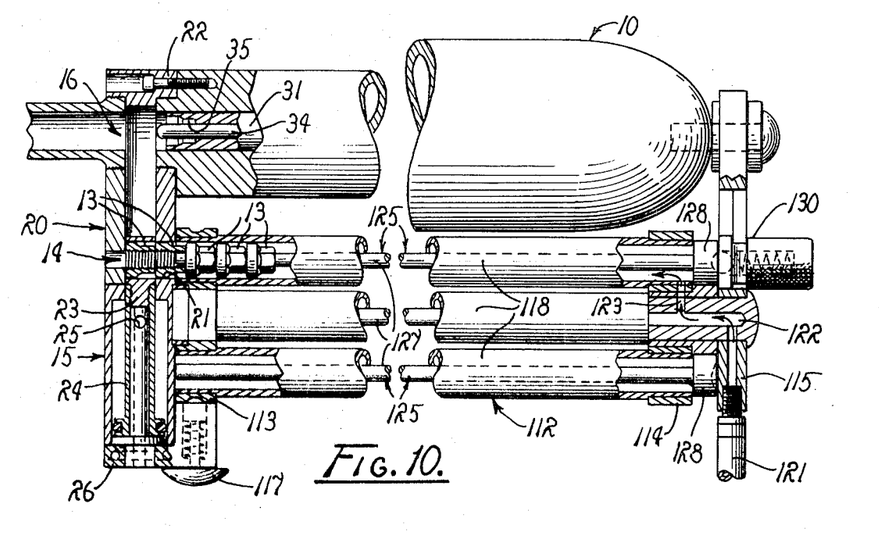
FIG. 10 is a fragmentary view, partly in vertical transverse section showing the supply magazine and transfer mechanism of the tool.

As can be seen in FIGS. 7, 8, and 9 the magazine 112 includes a pair of axially spaced end plates 113 and 114 provided with a plurality of circumferentially spaced receiving apertures in which are pressed individual supply tubes 118. Referring to FIGS. 8 and 10, a bracket 115 at the rear of the tool supports one end of the cylinder 112 for rotation while providing admission of air under pressure through a line 121. A port 122 in the center bearing is in communication with a similar port 123 in tube 118. Consequently, only the tube aligned with delivery station 14 is pressurized.

As can be seen in FIGS. 10 through 13, each of the individual chambers of the cylinder 112 are adapted to receive a supply of nuts 13, threaded upon an elongated spindle 125. A loading gate 130 is mounted for movement to an open position for a selected one of the receiving chambers, as can be seen in FIG. 8, to permit the loading spindle and the nuts to be received within the chamber. The dimensions of the spindle are selected for accommodation by the chambers of the cylinder 112. Operation of the detent 117 permits incremental rotation of the cylinder so as to index a selected chamber with either the loading gate 130 or the delivery station 14. As in the form of the invention in FIGS. 1, 2, and 3, the air under pressure urges the nuts toward the delivery station and insures a nut is positioned therein so long as a supply of nuts exist in the selected chamber and air under pressure is available thereto.

Figure 13:
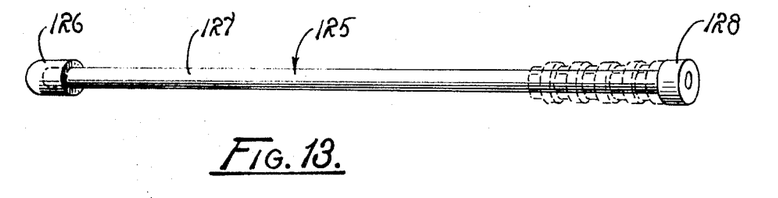
FIG. 13 is an isometric view of a multiple function shipping, loading and delivery carrier of the systematized apparatus and adapted to be supported within the magazine. The carrier spindle is shown as being partially loaded with a supply of nuts to be driven by the tool.

As shown in FIG. 13 a multiple function carrier is shown in the form of a spindle 125. A plurality of nuts are carried thereon for shipping from the manufacturer to the assembly site, for loading the supply magazine 112 through the individual tubes 118, and for facilitating delivery of the individual nuts at discharge station 14. The spindle 125 is provided with a guide tip 126 detachably secured to an elongated shank 127. An enlarged head 128 is secured to the shank and may be integral therewith. The head serves the dual function of holding a supply of nuts on the shank, as well as pneumatically sealing the end of one of the tubes 118. With the guide tip secured to the shank, the nuts are held between the tip and the head for shipping and loading functions.

Figures 11, 12:
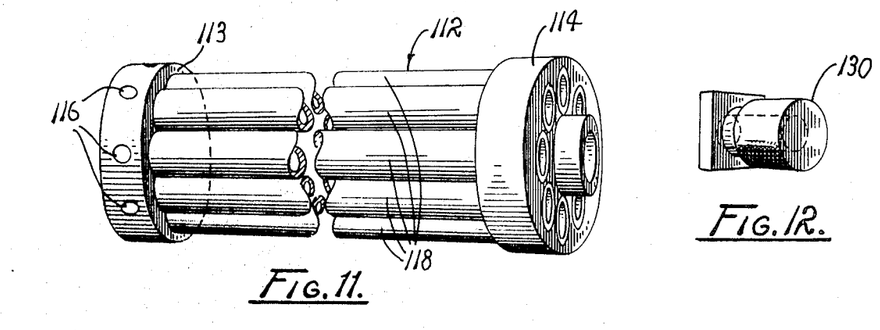
FIG. 11 is an isometric fragmentary view of the cylindrical form of supply magazine.
FIG. 12 is an isometric view of the loading gate associated with the supply magazine.

After insertion into the magazine 112 through loading gate 130, the tip is removed and discarded. As each chamber is emptied through repeated operation of the transfer and drive mechanisms, a new chamber is positioned in alignment with delivery station 114. Upon depletion of the nut supply in all chambers, reloading through gate 130 is performed as previously described.

The operation of the second form of the invention is similar to that of the first form except that preliminary loading of the cylindrical magazine 112 provides a greatly increased inventory of nuts available at the assembly site. As with the first form of the invention, the pilot pin 34 is placed in axial contact a bolt to receive the nut. Valve 17 is depressed routing air to shuttle piston 23 thereby to extend the same and move the nut from the delivery station 14 to the driving station 16. Sequentially, air is routed through port 25 in post 24 and subsequently to the rear of drive piston 31, thereby extending the drive piston in carrying socket 35 and the nut forwardly. Release of valve 17 effects retraction of piston 31, shuttle piston 23 and permits movement of another nut into delivery station 14 and the yoke of piston 23. Operation continues as long as a supply of nuts is available in magazine 112. Accordingly, the invention provides a systematized apparatus for delivery of individual threaded fasteners to a driving station at an assembly site and rotatably driving each fastener onto a cooperating bolt. The feeding and drive mechanism is adapted to deliver and drive individual internally threaded fasteners having an enlarged base and a reduced diametral dimension wrenching surface. The system also provides a multiple function spindle type carrier for shipping, loading and delivery of the fasteners.

I claim:

1. A portable powered tool for individually delivering and drivably rotating threaded female fasteners, each fastener having an externally presented wrenching surface of non-circular configuration in cross-section, the tool comprising:
   a. a supporting frame;
   b. means connecting the tool to a source of power;
   c. a tool socket having an internal wrenching surface of non-circular configuration in cross-section complementary to said external wrenching surface and being mounted in the frame for rotation about an axis;
   d. supply means for said female fasteners carried by the frame and adapted to hold a plurality of said fasteners and to deliver same in a selected position of orientation at a discharge station;
   e. powered transfer means carried by the frame and adapted to receive an individual fastener at said discharge station and to transport said fastener to a driving station;
   f. drive motor means for drivably rotating said tool socket and any individual fastener held therein;
   g. first power circuit means selectively actuable to establish communication with said source of power and for powering said transfer motor means to move said transfer means between said discharge and said driving station; and i. second power circuit means operable responsively to movement of said transfer means for powering said drive motor means.

2. The portable tool of claim 1 wherein said transfer means transports a fastener in a path of travel to said driving station in a radially inwardly direction toward the axis of rotation of said tool socket.

3. The tool of claim 1 wherein said second power circuit means blocks power to said drive motor means except when said transfer means is in a predetermined position.

4. The tool of claim wherein said supply means comprises an elongated cylindrical magazine mounted in the frame for rotation about an axis substantially parallel to that of said tool socket and said magazine is provided with a plurality of axially extended chambers arranged in spaced circumferential positions about said axis.

5. A powered hand tool for delivering and rotatably driving individual female threaded fasteners, each fastener having an external wrenching surface of noncircular configuration cross-section, the tool comprising:
  a. a frame, including grip means;
  b. drive motor means carried in the frame and adapted for rotation about an axis;
  c. a tool socket affording an internal wrenching surface of a configuration complementary to said external surface;
  d. transmission means connecting said tool socket with said motor means;
  e. an elongated cylindrical supply magazine mounted in the frame for rotation about its longitudinal axis and having a plurality of axially extending chambers parallel to said axis and circumferentially spaced therearound, each of said chambers being adapted to receive a plurality of female fasteners and to deliver same individually at a discharge station adjacent one end of the magazine;
  f. a transport yoke adapted to releasably hold an individual fastener;
  g. mounting means for said yoke supporting the yoke for movement between said discharge station and a driving station;
  h. powered operating means for movement of said yoke between said stations;
  i. a source of power;
  j. means connecting the tool and the source of power;
  k. first power control means selectively actuable to operate said yoke operating means and move the yoke from the discharge station to the driving station; and
  l. second power control means responsive to movement of said transport yoke to said driving station and effective to connect said drive motor with the source of power.

6. The hand tool of claim 5 wherein said transmission means for said tool socket includes powered reciprocable mounting means for the socket, permitting movement along the axis of rotation and wherein said second power control means is effective to extend the socket along said axis while being rotated by said drive motor.

7. The hand tool of claim 5 wherein said yoke mounting means permits transport of an individual fastener in a path of travel angularly related to the axis of rotation of said socket.

8. The hand tool of claim 7 wherein said path of travel is substantially radially oriented relative to said axis of rotation.

9. Systematized Apparatus for delivery of individual threaded fasteners to a driving station at an assembly site and rotatably driving the same, the apparatus comprising a supporting frame; supply means connected to the frame and providing an inventory of threaded fasteners available at a position in close proximity to the driving station, including a discharge station and means to present individual fasteners thereat;
  Powered transfer means carried on the frame to transport an individual fastener from the discharge station to the driving station;
  Powered driving mechanism secured to the frame and adapted for axial advancement of said individual fastener from the driving station onto a receiving complementary fastener and for concurrent rotation of one of the fasteners to effect a threaded connection therebetween; and
  Coordinated power control means for said transfer means and driving mechanism to effect sequential operation of the transfer means to effect movement of a fastener from the discharge station to the driving station prior to actuation of the driving mechanism.

10. The apparatus of claim 9 wherein the supply means comprises an elongated magazine providing an internal chamber to accommodate the diametral dimension of the threaded fasteners, and wherein fluid pressure is applied to one end of the magazine remote from the delivery station thereby to advance the fasteners toward said station.

11. The apparatus of claim 9 wherein the supply means is mounted for rotation on the frame and comprises an elongated magazine having a plurality of internal fasteners receiving chambers circumferentially spaced about the axis of rotation, including means for individually selectively connecting one of said chambers with the fluid under pressure thereby to move the fasteners in said selected chamber toward the delivery station.

12. The apparatus of claim 11 wherein the fasteners are temporarily mounted on elongated headed spindles adapted for slidable reception of a plurality of female fasteners and for insertion into one of said chambers, wherein the spindle head substantially seals one end of said chamber opposite from the delivery station.

13. For use in systematized apparatus for delivery of individual, internally threaded fasteners combined with a shipping, loading and delivery carrier comprising:
  a. an elongated spindle having a shaft adapted for axial insertion through a plurality of such fasteners;
  b. an enlarged head secured to the shaft at one end to limit axial movement of the fasteners along the shaft toward said one end; and
  c. an entry tip secured to the shaft at the end opposite the head to limit axial movement of said fasteners toward said opposite end.

14. The combined shipping, loading, and delivery carrier of claim 13 wherein said entry tip is tapered at its outer end and is detachably secured to said shaft.

* * * * *

REEXAMINATION CERTIFICATE (447th)
United States Patent
Berecz

[11] B1 3,750,257
[45] Certificate Issued  Jan. 28, 1986

[54] SYSTEMATIZED APPARATUS FOR DRIVING FASTENERS

[75] Inventor: Imre Berecz, Yorba Linda, Calif.

[73] Assignee: Kaynar Mfg. Co., Inc., Fullerton, Calif.

Reexamination Request:
No. 90/000,438, Aug. 29, 1983

Reexamination Certificate for:
Patent No.: 3,750,257
Issued: Aug. 7, 1973
Appl. No.: 214,262
Filed: Dec. 30, 1971

[51] Int. Cl.⁴ .................. B23Q 7/10; B23P 19/04
[52] U.S. Cl. ........................... 29/813; 29/240; 81/430; 81/433; 206/338; 206/493
[58] Field of Search .......... 81/430, 57.37, 433, 81/435; 29/813, 240; 221/312 A; 206/493, 338; 411/185, 186, 427

[56] References Cited
U.S. PATENT DOCUMENTS

| | | | |
|---|---|---|---|
| 1,800,459 | 4/1931 | Maclean | 221/190 |
| 1,875,930 | 9/1932 | Martin | 411/186 |
| 2,011,070 | 8/1935 | Mooter . | |
| 2,253,241 | 8/1941 | MacDonald | 411/186 |
| 2,650,722 | 9/1953 | Stabile | 221/220 |
| 2,704,952 | 3/1955 | Mooter . | |
| 2,895,360 | 7/1959 | Madsen | 81/431 |
| 2,930,267 | 3/1960 | Apicelli . | |
| 2,930,503 | 3/1960 | Hamlin et al. | 206/338 |
| 3,228,555 | 1/1966 | Pinto | 221/312 R |
| 3,279,591 | 10/1966 | Steinbock . | |
| 3,561,641 | 2/1971 | Kerr, Jr. . | |

*Primary Examiner*—James L. Jones, Jr.

[57] ABSTRACT

This construction relates to systematized apparatus for driving fasteners used in assembly of fabricated structures. The system includes a power-operated portable tool for automatically delivering individual threaded female fasteners for attachment to a cooperating bolt and sequentially rotating the fastener to form a bolted connection. The construction provides a supply of fasteners, a feeding mechanism to deliver individual fasteners to a driving station, and an automatically controlled power tool for drivably rotating the fastener. The construction has particular utility in driving fasteners having external wrenching surfaces of a diametral dimension less than that of the base of the fastener.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 5, lines 61–66:
As shown in FIG. 13 a multiple function carrier is shown in the form of a spindle 125. A plurality of nuts are carried thereon for shipping from the manufacturer to the assembly site, for loading the supply magazine 112 through the individual tubes 118, and for facilitating delivery of the individual nuts at discharge station 14. The spindle 125 is provided with a guide tip 126 detachably secured to an elongated shank 127. An enlarged head 128 is secured to the shank and may be integral therewith. [The] *As shown in FIG. 10, the* head *128 on each spindle 125 is trapped between the bracket 115 and its associated tube 118 and* serves the dual function of holding a supply of nuts on the shank, as well as pneumatically sealing the end of one of the tubes 118. With the guide tip secured to the shank, the nuts are held between the tip and the head for shipping and loading functions.

AS A RESULT OF REEXAMINATION, IT HAS BEEN DETERMINED THAT:

The patentability of claims 1–12 is confirmed.

Claims 13 and 14 are cancelled.

New claims 15 and 16 are added and determined to be patentable.

*15. For use in a systematized nut driving apparatus comprising an elongate magazine defining an internal right circular cylindrical chamber having a first diameter, said magazine having a loading end provided with a magazine sealing surface extending radially outwardly from the chamber at a right angle to the central axis of said chamber to a second diameter greater than said first diameter, said magazine including a delivery station at an end opposite the loading end thereof, said magazine also including an air inlet communicating with the chamber thereof adjacent the loading end thereof for the introduction of pressurized air to effect delivery of nuts to the delivery station, a support bracket for said magazine having a loading gate therein aligned with but spaced from the sealing surface on said magazine, and a plurality of internally threaded nuts each comprising a body having a radially extending bearing surface and a circular radially outer periphery extending to a third diameter slightly smaller than said first diameter so as to be slidably accepted in the chamber of said magazine and propellable therethrough by pressurized air introduced into the chamber through the air inlet in said magazine, the body of each of said nuts having external wrenching surfaces axially spaced from the bearing surface thereof extending to a fourth maximum transverse dimension smaller than said third diameter, the body of each of said nuts having an internally threaded bore open at each end and having a fifth minimum internal diameter smaller than said fourth transverse dimension,*

*a multipurpose shipping, loading, delivery, and magazine sealing but carrier comprising an elongate shaft having a sixth transverse dimension smaller than said fifth minimum internal diameter and acceptable axially through the bore of each of said nuts for the slidable support thereof, said carrier having a rigid enlarged head longitudinally fixed to the shaft at one end thereof to limit axial movement of said nuts along the shaft toward the one end thereof, the head having a carrier sealing surface lying in a plane extending generally parallel to the sealing surface on said magazine and extending radially outwardly to a diameter greater than said first diameter and facing the end of the shaft opposite said one end so as to be engageable in pneumatic sealing relationship with the magazine sealing surface on the loading end of said magazine, the head on said carrier having a substantial longitudinal dimension and a radially extending end surface so as to be tightly accepted between the sealing surface on said magazine and the loading gate on said support bracket to preclude movement of said carrier out of said magazine, whereby an air pressure differential is created across said nuts upon the introduction of pressurized air through the magazine air inlet into the chamber thereof effective to urge said nuts toward the delivery station of said magazine, and*

*an entry tip secured to the shaft at the end opposite the head thereon to limit axial movement of said nuts toward said opposite end.*

*16. For use in a systematized nut driving apparatus comprising an elongate magazine defining an internal right circular cylindrical chamber having a first diameter, said magazine having a loading end provided with a magazine sealing surface extending radially outwardly from the chamber thereof to a second diameter greater than said first diameter, said magazine including a delivery station at an end opposite the loading end thereof, said magazine also including an air inlet communicating with the chamber thereof adjacent the loading end thereof for the introduction of pressurized air to effect delivery of nuts to the delivery station,*

*the combination of*
  *a plurality of internally threaded nuts mounted on a multipurpose shipping, loading, delivery, and magazine sealing nut carrier,*
  *each of said nuts comprising a body having a radially extending bearing surface and a circular radially outer periphery extending to a third diameter slightly smaller than said first diameter so as to be slidably accepted in the chamber of said magazine and propellable therethrough by pressurized air introduced into the chamber through the air inlet in said magazine, the body of each of said nuts having external wrenching surfaces axially spaced from the bearing surface thereof extending to a fourth maximum transverse dimension smaller than said third diameter, the body of each of said nuts having an internally threaded bore open at each end and having a fifth minimum internal diameter smaller than said fourth transverse dimension,*
  *said carrier comprising an elongate shaft having a sixth transverse dimension smaller than the fifth minimum* internal diameter of said nuts extending axially through the bore of each of said nuts for the slidable support thereof, said carrier having an enlarged rigid head longitudinally fixed to the shaft at one end thereof to limit axial movement of said nuts along the shaft toward the one end thereof, the head having a carrier sealing surface extending generally parallel to the sealing surface on said magazine and radially outwardly to a diameter greater than said first diameter so as to be engageable in pneumatic sealing relationship with the magazine sealing surface on the loading end of said magazine whereby an air pressure differential is created across said nuts upon the introduction of pressurized air through the magazine air inlet into the chamber thereof effective to urge said nuts toward the delivery station of said magazine, and an entry tip secured to the shaft at the end opposite the head thereon to limit axial movement of said nuts toward said opposite end.

* * * * *